United States Patent
Tang

(10) Patent No.: US 10,012,862 B2
(45) Date of Patent: Jul. 3, 2018

(54) METHOD FOR MANUFACTURING LIQUID CRYSTAL CELL, LIQUID CRYSTAL CELL, AND DISPLAY DEVICE

(71) Applicants: Shenzhen China Star Optoelectronics Technology Co., Ltd., Shenzhen, Guangdong (CN); Wuhan China Star Optoelectronics Co., Ltd., Wuhan, Hubei (CN)

(72) Inventor: Yuejun Tang, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 117 days.

(21) Appl. No.: 14/778,127

(22) PCT Filed: Apr. 23, 2015

(86) PCT No.: PCT/CN2015/077269
§ 371 (c)(1),
(2) Date: Dec. 10, 2015

(87) PCT Pub. No.: WO2016/155060
PCT Pub. Date: Oct. 6, 2016

(65) Prior Publication Data
US 2017/0108737 A1   Apr. 20, 2017

(30) Foreign Application Priority Data

Apr. 2, 2015 (CN) .......................... 2015 1 0152319

(51) Int. Cl.
G02F 1/1339 (2006.01)
G02F 1/1335 (2006.01)
G02F 1/1341 (2006.01)

(52) U.S. Cl.
CPC ...... G02F 1/133512 (2013.01); G02F 1/1339 (2013.01); G02F 1/1341 (2013.01); G02F 1/133514 (2013.01); G02F 1/133528 (2013.01)

(58) Field of Classification Search
CPC ............... F21V 11/00; G02F 1/133512; G02F 1/133514; G02F 1/133528; G02F 1/1341; H01L 51/5284; H01L 51/56
See application file for complete search history.

(56) References Cited

U.S. PATENT DOCUMENTS 6,407,783 B1 * 6/2002 Ohgawara ......... G02F 1/133512
349/110
7,499,130 B2 * 3/2009 Tsai .................. G02F 1/133512
349/110

(Continued)

Primary Examiner — Huyen Ngo
(74) Attorney, Agent, or Firm — Kim Winston LLP

(57) ABSTRACT

Provided is a method for manufacturing a liquid crystal cell, comprising the steps of: providing frame-sealing glue between an array substrate and a transparent plate of a color filter substrate; irradiating the frame-sealing glue from a side of the color filter substrate facing away from the array substrate with ultraviolet light until the frame-sealing glue is cured, so as to fixedly connect the transparent plate and the array substrate; and forming a light-shielding layer on a side of the transparent plate facing away from the array substrate, wherein the light-shielding layer has a projection along a vertical direction covering the frame-sealing glue. A liquid crystal cell manufactured through such a method has superior display effects.

6 Claims, 5 Drawing Sheets

(56) References Cited

U.S. PATENT DOCUMENTS

2013/0301263 A1* 11/2013 Yamanaka ................ G09F 9/35
                                                       362/235
2017/0075165 A1*  3/2017 Kato .................. G02F 1/133512

* cited by examiner

METHOD FOR MANUFACTURING LIQUID CRYSTAL CELL, LIQUID CRYSTAL CELL, AND DISPLAY DEVICE

CROSS-REFERENCE TO RELATED APPLICATIONS

The present application claims the priority of Chinese patent application CN 201510152319.0, entitled "Method for manufacturing liquid crystal cell, liquid crystal cell, and display device" and filed on Apr. 2, 2015, the entirety of which is incorporated herein by reference.

FIELD OF THE INVENTION

The present disclosure relates to the field of display technologies, and in particular, to a method for manufacturing a liquid crystal cell. The present disclosure further relates to a liquid crystal cell manufactured through the method, and a display device comprising the liquid crystal cell.

BACKGROUND OF THE INVENTION

Liquid crystal display technologies are now being highly developed and attaching much attention. As a footstone of the information industry, the liquid crystal display technologies, which are involved in wide varieties of technologies and have tremendous industrial driving forces, have become significant reflections of industrialization and competitiveness of a country. And liquid crystal cells are one of the principal cores of the liquid crystal display technologies.

According to the prior art, a liquid crystal cell is typically provided therein with a black matrix, so as to prevent leakage of backlight from a non-display area. However, restricted by existing processing technologies, it is impossible to arrange the black matrix at a region where frame-sealing glue is located or therearound. This is to ensure successful curing of the frame-sealing glue when it is irradiated by ultraviolet light from a relevant side. Under such circumstances, however, backlight leakage will occur at a position of a sealing frame where no black matrix is arranged, thereby deteriorating display effects of the liquid crystal cell. Consequently, users cannot obtain high-quality image information therefrom.

Therefore, there is a need of a method for manufacturing a liquid crystal cell having improved display effects.

SUMMARY OF THE INVENTION

Directed against the above problem, the present disclosure provides a method for manufacturing a liquid crystal cell. The method can be used to manufacture liquid crystal cells of superior display effects. The present disclosure also provides a liquid crystal cell manufactured through the above method. The liquid crystal cell shows prominent display effects. The present disclosure further provides a display device using the above liquid crystal cell. The display effects of the display device are remarkable.

According to a first aspect of the present disclosure, a method for manufacturing a liquid crystal cell is provided, comprising the steps of: providing frame-sealing glue between an array substrate and a transparent plate of a color filter substrate; irradiating the frame-sealing glue from a side of the color filter substrate facing away from the array substrate with ultraviolet light until the frame-sealing glue is cured, so as to fixedly connect the transparent plate and the array substrate; and forming a light-shielding layer on a side of the transparent plate facing away from the array substrate, wherein the light-shielding layer has a projection along a vertical direction covering the frame-sealing glue.

According to the method for manufacturing a liquid crystal cell of the present disclosure, when the frame-sealing glue is being cured, the liquid crystal cell is transparent on a side thereof where the color filter substrate is arranged, such that the ultraviolet light can manage to irradiate the frame-sealing glue and cure it. And after the frame-sealing glue is cured, the light-shielding layer is then provided on the side of the transparent plate facing away from the array substrate at a corresponding position. Since the light-shielding layer covers the corresponding position of the frame-sealing glue, backlight cannot pass therethrough, and thus will not affect display effects of the liquid crystal cell to be manufactured. In addition, since the backlight cannot pass through the light-shielding layer, the display device using the liquid crystal cell can be manufactured with a narrower frame or even no frame.

In one embodiment, a surface of the transparent plate facing the array substrate is provided with a black matrix, which is configured to not being overlapped with the frame-sealing glue, and the projection of the light-shielding layer along the vertical direction partially overlaps the black matrix. Such being the case, the backlight passing between the black matrix and the frame-sealing glue can be effectively shaded by the light-shielding layer, thereby further ensuring display effects of the liquid crystal cell thus manufactured.

In one embodiment, the light-shielding layer is fit to a surface of the transparent plate facing away from the array substrate. Such a light-shielding layer can be conveniently processed at relatively low costs.

In one embodiment, the color filter substrate further comprises a polarizer located on the side of the transparent plate facing away from the array substrate, and the light-shielding layer is provided on a surface of the polarizer. The polarizer is provided on a surface of the transparent plate in such a manner that the light-shielding layer is facing the transparent plate; or alternatively, the polarizer is provided on the surface of the transparent plate in such a manner that the light-shielding layer is facing away from the transparent plate. Such a liquid crystal cell of a simple structure can be manufactured through simple and convenient procedures at relatively low costs.

In one embodiment, the color filter substrate further comprises a polarizer located on the side of the transparent plate facing away from the array substrate, and the light-shielding layer is arranged in an inner portion of the polarizer. Such a liquid crystal cell of a simple structure can be manufactured through simple and convenient procedures at relatively low costs. In addition, the light-shielding layer arranged in the inner portion of the polarizer is of high stability, and can thus further guarantee display effects of the liquid crystal cell.

According to a second aspect of the present disclosure, a liquid crystal cell is provided, which is manufactured according to the method as described above in the first aspect of the present disclosure. The liquid crystal cell comprises: a color filter substrate including a transparent plate, an array substrate directly opposite to and spaced from the transparent plate, and frame-sealing glue disposed between the transparent plate and the array substrate to connect the transparent plate and the array substrate, wherein the transparent plate is provided with a light-shielding layer on a side thereof facing away from the array substrate, and the light-shielding layer has a projection along a vertical direction covering the frame-sealing glue.

In one embodiment, the color filter substrate further comprises a polarizer located on the side of the transparent plate facing away from the array substrate, and the light-shielding layer is provided between the polarizer and the transparent plate. Such a light-shielding layer can be manufactured through convenient procedures at relatively low costs. In addition, the light-shielding effects of the light-shielding layer are superior.

In one embodiment, the color filter substrate further comprises a polarizer located on the side of the transparent plate facing away from the array substrate, and the light-shielding layer is arranged in an inner portion of the polarizer. Such a liquid crystal cell of a simple structure can be manufactured through simple and convenient procedures at relatively low costs. In addition, the light-shielding layer arranged in the inner portion of the polarizer is of high stability, and can thus further guarantee display effects of the liquid crystal cell.

In one embodiment, the color filter substrate further comprises a polarizer located on the side of the transparent plate facing away from the array substrate, and the light-shielding layer is arranged on a surface of the polarizer facing away from the transparent plate. Such a light-shielding layer can be processed through convenient procedures at relatively low costs.

According to a third aspect of the present disclosure, a display device is further provided, comprising the liquid crystal cell as described above in the second aspect of the present disclosure. The above liquid crystal cell is manufactured through the method as described in the first aspect of the present disclosure. Such a display device has superior display effects, and a narrower frame or even no frame.

According to the liquid crystal cell of the present disclosure, the backlight enters the liquid crystal cell from the side where the array substrate is located, and exits from the side where the color filter substrate is located. The backlight passing by a sealing frame will be shaded by the light-shielding layer, and cannot pass therethrough, thereby effectively preventing leakage of the backlight from the sealing frame. This enables light, after passing through the liquid crystal cell, to become light of required color and intensity as anticipated, instead of being mixed with the backlight, thereby ensuring color and purity of the light after passing through the liquid crystal cell, and improving contrast of the light in color.

It should be understood that the "vertical direction" herein refers to a direction perpendicular to a plane in which the color filter substrate is located.

Compared with the prior art, the present disclosure has the following advantages. At the outset, when the frame-sealing glue is being cured, the side thereof where the color filter substrate is arranged is transparent, such that the ultraviolet light can successfully irradiate the frame-sealing glue to cure it. After the frame-sealing glue is cured, the light-shielding layer is then provided at the corresponding position on the side of the transparent plate facing away from the array substrate. Moreover, the light-shielding layer covers the corresponding position of the frame-sealing glue, such that the backlight cannot pass therethrough, and therefore will not affect the display effects of the liquid crystal cell to be manufactured. In addition, since the backlight cannot exit from the light-shielding layer, the display device using such a liquid crystal cell can have a narrower frame or even no frame.

BRIEF DESCRIPTION OF THE DRAWINGS

In the following, the present disclosure will be illustrated in detail in connection with embodiments and accompanying drawings, in which.

Figure 1:
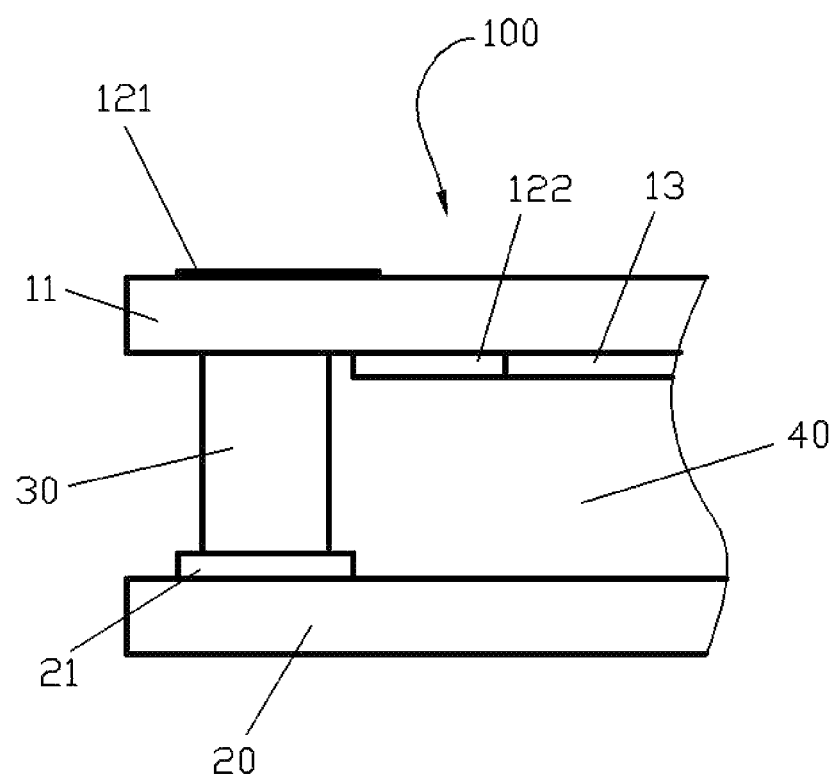
FIG. 1 shows a first embodiment of a liquid crystal cell of the present disclosure.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

FIGS. 1-4 schematically show the structure of a liquid crystal cell 100 of the present disclosure.

The liquid crystal cell 100 comprises a color filter substrate, an array substrate 20, and frame-sealing glue 30 which is disposed between the color filter substrate and the array substrate 20 and connecting the color filter substrate and the array substrate 20. The color filter substrate and the array substrate 20, which directly face each other, form a closed liquid crystal chamber 40, along with the frame-sealing glue 30. The liquid crystal chamber 40 is provided therein with a display area 13. Light entering the liquid crystal cell 100 through the array substrate 20, after passing through the display area 13, can be converted into light of required color and brightness and then exit from a side where the color filter substrate is located. The structure of the display area 13 is known in the art, and will therefore not be repeated herein. In the following, the structure of a non-display area of the liquid crystal cell 100 will be further described in detail.

The non-display area herein refers to a region provided with the frame-sealing glue 30 and therearound. The frame-sealing glue 30 is typically transparent, and light can thus directly pass therethrough. Generally, backlight enters a display device from a side thereof where the array substrate 20 is located, and is converted into light of required color and brightness after passing through the display area 13. Nevertheless, the backlight will also pass through the region where the frame-sealing glue 30 is arranged, and directly exit from the side where the color filter substrate is located. Such being the case, the backlight that exits through the non-display area will interfere with the backlight that exits through the display area 13, thereby generating mixed light, reducing contrast in color of light exiting from the liquid crystal cell, and attenuating definition and vividness of color of a picture being displayed. In order to prevent generation of mixed light, the color filter substrate of the present disclosure comprises a transparent plate 11, which is, through an inner surface thereof, connected to the frame-sealing glue 30, such that the transparent plate 11, along with the frame-sealing glue 30 and the array substrate 20, forms the liquid crystal chamber 40. Moreover, a light-shielding layer 121 is provided on a side of the transparent plate 11 facing away from the frame-sealing glue 30, and configured to have a projection along a vertical direction completely covering the frame-sealing glue 30. Thus, the backlight, after passing through the frame-sealing glue 30, will be blocked by the light-shielding layer from leaving the liquid crystal cell 100, thus preventing occurrence of light mixing between the backlight exiting from the frame-sealing glue 30 and the light of required color and brightness that passes through the display area 13. The liquid crystal cell 100 can be used to prevent backlight leakage from the frame-sealing glue 30, thereby improving color purity of the light passing through the liquid crystal cell 100, and enhancing display contrast. Thus, the display effects of the liquid crystal cell 100 can be effectively ameliorated.

Figure 5:
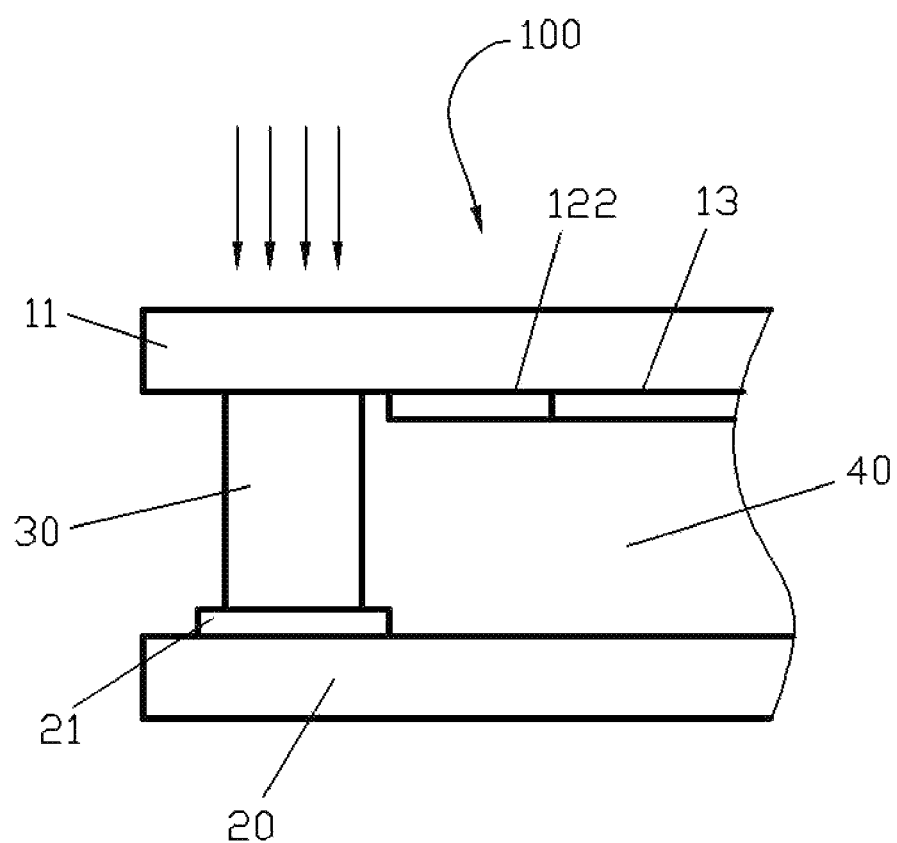
FIG. 5 schematically shows curing of frame-sealing glue of the liquid crystal cell of the present disclosure.

The frame-sealing glue 30 is typically formed through curing of a colloid. As depicted in FIG. 5, after the transparent plate 11, the frame-sealing glue 30, and the array substrate 20 are stacked, ultraviolet light is used to irradiate and cure the frame-sealing glue 30 from a side where the transparent plate 11 is located. In order to ensure successful curing of the frame-sealing glue 30, the light-shielding layer 121 covering the frame-sealing glue 30 should be formed onto the color filter substrate after the frame-sealing glue 30 is cured, on a side of the transparent plate 11 facing away from the frame-sealing glue 30.

The projection of the light-shielding layer 121 on the inner surface of the transparent plate 11 should cover the frame-sealing glue 30 completely, such that the backlight can be effectively prevented from passing therethrough to mix with the light exiting from the display area 13. In addition, such an arrangement of the light-shielding layer 121 will not interfere with curing of the frame-sealing glue 30. As a result, those skilled in the art can perform curing on the frame-sealing glue 30 by means of an existing curing procedure, which is simple and of low manufacturing costs. It will be unnecessary to develop any new curing procedures or new curing devices, or retrain any operators.

As shown in FIGS. 1-4, the light-shielding layer 121 can be arranged on the side of the transparent plate 11 facing away from the frame-sealing glue 30 through a plurality of approaches.

FIG. 1 indicates a first embodiment of the present disclosure. In the embodiment as shown in FIG. 1, the light-shielding layer 121, after curing of the frame-sealing glue 30, is directly fit to the transparent plate 11.

Figure 2:
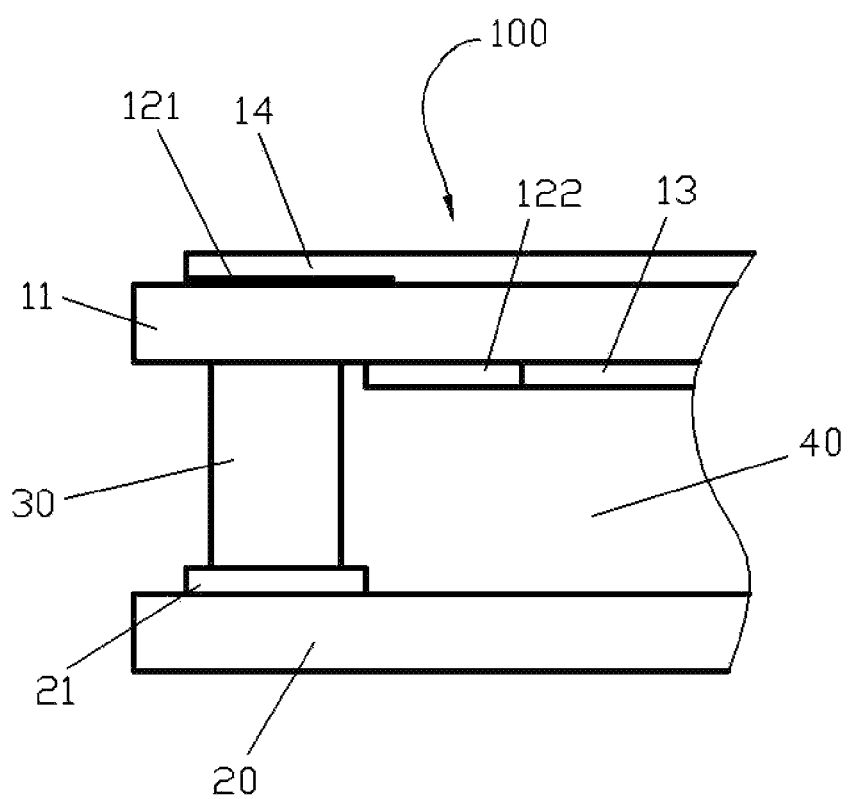
FIG. 2 shows a second embodiment of the liquid crystal cell of the present disclosure.
Figure 3:
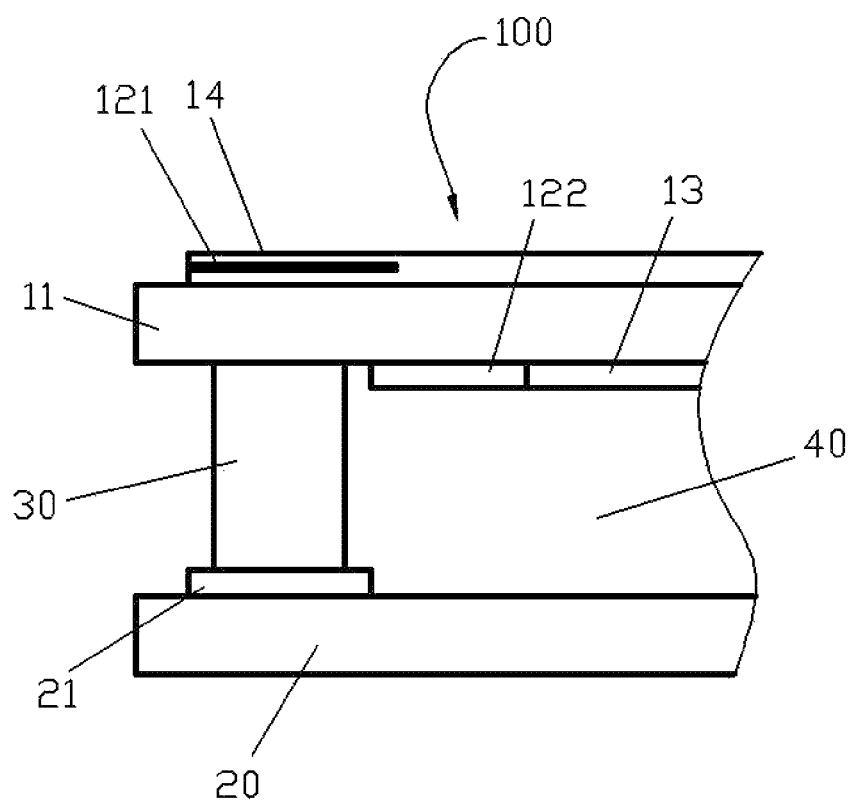
FIG. 3 shows a third embodiment of the liquid crystal cell of the present disclosure.
Figure 4:
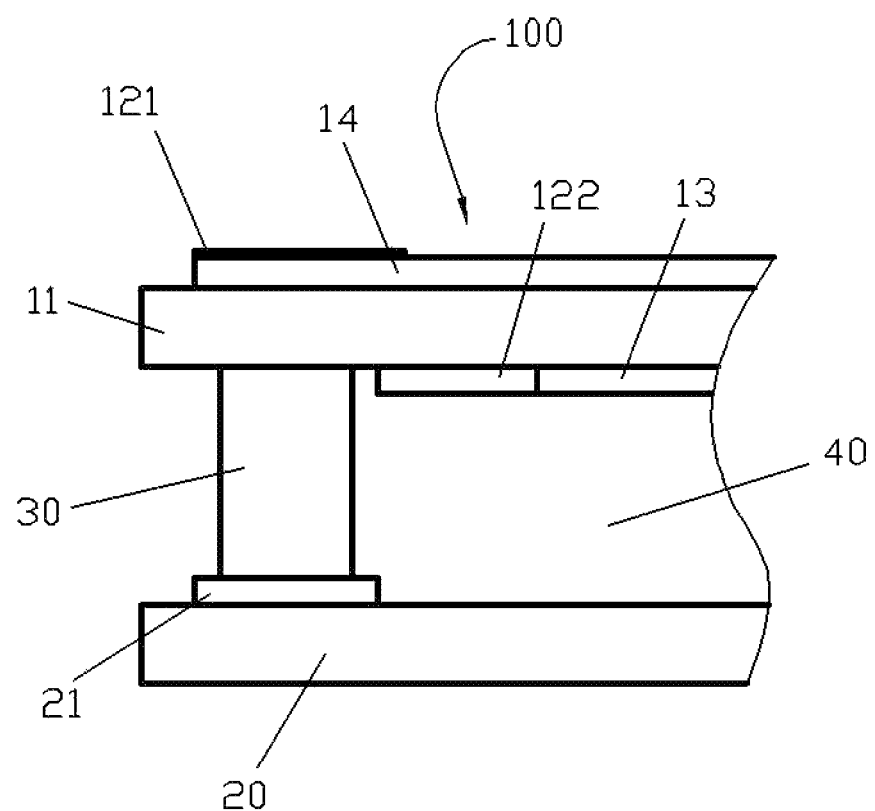
FIG. 4 shows a fourth embodiment of the liquid crystal cell of the present disclosure.

As shown in FIGS. 2-4, the color filter substrate preferably further comprises a polarizer 14 provided on an outer surface of the transparent plate 11. The inner surface herein refers to a surface facing the array substrate or a sealing frame, while the outer surface refers to a surface facing away from the array substrate or the sealing frame.

FIG. 2 shows a second embodiment of the present disclosure. In the embodiment as shown in FIG. 2, the light-shielding layer 121 is first arranged on a side of the polarizer 14 facing the transparent plate 11. After the frame-sealing glue 30 is cured, the polarizer 14 provided with the light-shielding layer 121 is arranged on the transparent plate 11, such that the light-shielding layer 121 can effectively prevent the backlight from exiting through the region where the frame-sealing glue 30 is arranged. As such, the light-shielding layer 121 will be disposed between the transparent plate 11 and the polarizer 14. In addition, because the light-shielding layer 121 is adjacent to a black matrix 122, an overlapping portion between the light-shielding layer and the black matrix can be arranged to be relatively small, thereby cutting down manufacturing costs of the liquid crystal cell.

FIG. 3 shows a third embodiment of the present disclosure. In the embodiment as shown in FIG. 3, the light-shielding layer 121 is embedded into the polarizer 14 when the latter is being manufactured. After the frame-sealing glue 30 is cured, the polarizer 14 embedded with the light-shielding layer 121 is arranged on the transparent plate 11. The light-shielding layer 121 can effectively prevent the backlight from passing therethrough.

FIG. 4 shows a fourth embodiment of the present disclosure. In the embodiment as shown in FIG. 4, the light-shielding layer 121 is fit to a side of the polarizer 14 facing away from the transparent plate 11. After the frame-sealing glue 30 is cured, the polarizer 14 is arranged on the transparent plate 11. It should be noted herein that, the light-shielding layer 121 can be first arranged on the polarizer 14, which is then arranged on the transparent plate 11. Alternatively, the light-shielding layer 121 can be formed onto the polarizer 14 after the latter is arranged on the transparent plate 11.

In each of the above four embodiments, the light-shielding layer 121 can be conveniently formed onto the transparent plate 11 or onto the polarizer 14. This facilitates processing of the liquid crystal cell 100, and reduces manufacturing difficulty and improves production efficiency thereof. In addition, in the third embodiment, the light-shielding layer 121 is embedded into the polarizer 14, and therefore will not easily deviate. This further ensures effective blocking of the backlight, by the light-shielding layer 121, from passing through the liquid crystal cell 100 to mix with light passing through the display area 13.

It should be understood herein that, the light-shielding layer can be configured to have different sections. That is, any two or more approaches as explained above in the four embodiments can be simultaneously employed to arrange the light-shielding layer, so as to satisfy specific requirements in use.

Preferably, the light-shielding layer 121 can be arranged to be so large as to enable the projection of the light-shielding layer 121 on the inner surface of the transparent plate 11 to have a larger area than a projection of the frame-sealing glue 30 on the inner surface of the transparent plate 11. Thus, the light-shielding layer 121 can shade light from not only the frame-sealing glue 30, but also around the frame-sealing glue 30. This renders it less possible for the backlight to pass through the liquid crystal cell 100, thereby further enhancing display effects of the liquid crystal cell 100.

It should be understood herein that, the light-shielding layer 121 can be preferably selected as a black matrix made of metal chromium or light-absorbing material such as black resin.

As illustrated in FIGS. 1-5, the black matrix 122, which can be provided on the inner surface of the transparent plate 11, will not extend to the region where the frame-sealing glue 30 is located, so as to guarantee successful curing of the frame-sealing glue 30. In addition, the black matrix 122 can extend into the display area 13, so as to perform color resistance separation therein. Arrangement of the black matrix 122 is well known by those skilled in the art, and will therefore not be repeated herein.

Due to imperfect processing technologies, a gap will be typically formed between the frame-sealing glue 30 and the black matrix 122. The light-shielding layer 121 can be arranged to have such a structure that the projection thereof on the inner surface of the transparent plate 11 can cover the gap. More preferably, the light-shielding layer 121 and the black matrix 122 can overlap each other, so as to further prevent the backlight from passing through the liquid crystal cell 100.

In addition, as indicated in FIGS. 1-5, a metal layer 21, as a metal wire, can be arranged on the array substrate 20, so as to guarantee normal electrical connection of the liquid crystal cell 100. Because the metal layer 21 is opaque, it can be arranged at a connecting area between the array substrate 20 and the frame-sealing glue 30, to ensure light transmittance of the display area 13, thereby ensuring brightness of light passing through the liquid crystal cell 100 and further ensuring display effects of the liquid crystal cell 100. The metal layer 21 can, as shown in FIGS. 1-4, have a complete surface. That is, it is an integral piece without any openings or apertures arranged thereon. Such a metal layer 21 can be readily processed at low costs, thus further reducing processing difficulty of the liquid crystal cell 100 and cutting down processing costs thereof. The structure of the array substrate 20 is well known by those skilled in the art, and will therefore not be repeated herein.

Since light leakage does not easily occur in the region where the frame-sealing glue 30 is located or therearound. The non-display area can be configured to have even smaller sizes. Accordingly, in a display device using the liquid crystal cell 100, a frame used for shading such a non-display area can be arranged to be narrower, or alternatively, a display device having no frame can be manufactured.

Preferably, an integrated gate driver circuit can be used in the liquid crystal cell 100, in which case, the metal layer 21 can comprise the integrated gate driver circuit. This enables the frame of the display device to be narrower. The structure and arrangement of the integrated gate driver circuit are well known by those skilled in the art, and will therefore not be repeated herein.

It should be understood herein that, the frame herein refers to a portion arranged on a surface of the display device for shading the non-display area, so as to prevent light leakage therefrom. This is well known by those skilled in the art.

A method for manufacturing the above liquid crystal cell comprises the following steps.

In step 1), the frame-sealing glue is disposed between the transparent plate and the array substrate.

In step 2), ultraviolet light is used to irradiate the frame-sealing glue from the side where the transparent plate is arranged, to cure the frame-sealing glue. The cured frame-sealing glue can fixedly connect the transparent plate and the array substrate.

In step 3), the light-shielding layer is arranged on the side of the transparent plate facing away from the array substrate.

The light-shielding layer is arranged at a place opposite to the frame-sealing glue, in such a manner that the projection of the light-shielding layer along a vertical direction can cover the frame-sealing glue. Thus, the backlight passing through the frame-sealing glue can be blocked by the light-shielding layer from exiting through the color filter substrate.

The color filter substrate can comprise the polarizer. If the light-shielding layer is arranged on a surface of the transparent plate facing away from the array substrate, the light-shielding layer can be first arranged on the transparent plate, and then the polarizer is used to cover the transparent plate provided with the light-shielding layer in step 3).

If the light-shielding layer is arranged on a surface of the polarizer facing the transparent plate, it is necessary to first arrange the light-shielding layer on the polarizer, followed by arrangement of the polarizer on the transparent plate.

It should be understood herein that, the above arrangement manners are both used to arrange the light-shielding layer between the polarizer and the transparent plate, even when the polarizer incompletely covers or fails to cover the light-shielding layer.

Although the present disclosure has been described with reference to preferred embodiments, various modifications and variants to the present disclosure may be made by anyone skilled in the art, without departing from the scope of the present disclosure. In particular, as long as there is no structural conflict, various embodiments as well as the respective technical features mentioned herein may be combined with one another in any manner. The present disclosure is not limited to the specific embodiments disclosed herein, but rather includes all the technical solutions falling within the scope of the claims.

The invention claimed is:

1. A method for manufacturing a liquid crystal cell, comprising the steps of:
    providing frame-sealing glue between an array substrate and a transparent plate of a color filter substrate,
    irradiating the frame-sealing glue from a side of the color filter substrate facing away from the array substrate with ultraviolet light until the frame-sealing glue is cured, so as to fixedly connect the transparent plate and the array substrate, and
    forming a light-shielding layer on a side of the transparent plate facing away from the array substrate, wherein the light-shielding layer has a projection along a vertical direction covering the frame-sealing glue;
    wherein the color filter substrate further comprises a polarizer located on the side of the transparent plate facing away from the array substrate, and the light-shielding layer is embedded into the polarizer.

2. The method according to claim 1, wherein a surface of the transparent plate facing the array substrate is provided with a black matrix, which is configured to not being overlapped with the frame-sealing glue, and
    wherein the projection of the light-shielding layer along the vertical direction partially overlaps the black matrix.

3. A liquid crystal cell, comprising:
    a color filter substrate including a transparent plate,
    an array substrate directly opposite to and spaced from the transparent plate, and
    frame-sealing glue disposed between the transparent plate and the array substrate to connect the transparent plate and the array substrate,
    wherein the transparent plate is provided with a light-shielding layer on a side thereof facing away from the array substrate, and the light-shielding layer has a projection along a vertical direction covering the frame-sealing glue; and
    wherein a method for manufacturing the liquid crystal cell comprises the steps of:
    arranging the frame-sealing glue between the array substrate and the transparent plate of the color filter substrate,
    irradiating the frame-sealing glue from a side of the color filter substrate facing away from the array substrate with ultraviolet light until the frame-sealing glue is cured, so as to fixedly connect the transparent plate and the array substrate, and
    arranging the light-shielding layer on the side of the transparent plate facing away from the array substrate, wherein the projection of the light-shielding layer along the vertical direction covers the frame-sealing glue;

wherein the color filter substrate further comprises a polarizer located on the side of the transparent plate facing away from the array substrate, and the light-shielding layer is embedded into the polarizer.

4. The liquid crystal cell according to claim 3, wherein a surface of the transparent plate facing the array substrate is provided with a black matrix, which is configured to not being overlapped with the frame-sealing glue, and
wherein the projection of the light-shielding layer along the vertical direction partially overlaps the black matrix.

5. A display device, comprising a liquid crystal cell which includes:
a color filter substrate including a transparent plate,
an array substrate directly opposite to and spaced from the transparent plate, and
frame-sealing glue disposed between the transparent plate and the array substrate to connect the transparent plate and the array substrate,
wherein the transparent plate is provided with a light-shielding layer on a side thereof facing away from the array substrate, and the light-shielding layer has a projection along a vertical direction covering the frame-sealing glue; and
wherein a method for manufacturing the liquid crystal cell comprises the steps of:
arranging the frame-sealing glue between the array substrate and the transparent plate of the color filter substrate,
irradiating the frame-sealing glue from a side of the color filter substrate facing away from the array substrate with ultraviolet light until the frame-sealing glue is cured, so as to fixedly connect the transparent plate and the array substrate, and
arranging the light-shielding layer on the side of the transparent plate facing away from the array substrate, wherein the projection of the light-shielding layer along the vertical direction covers the frame-sealing glue;
wherein the color filter substrate further comprises a polarizer located on the side of the transparent plate facing away from the array substrate, and the light-shielding layer is embedded into the polarizer.

6. The display device according to claim 5, wherein a surface of the transparent plate facing the array substrate is provided with a black matrix, which is configured to not being overlapped with the frame-sealing glue, and
wherein the projection of the light-shielding layer along the vertical direction partially overlaps the black matrix.

* * * * *